No. 810,988. PATENTED JAN. 30, 1906.
H. C. STEELE, W. STENSON & F. J. TROUT.
MOLDING MACHINE.
APPLICATION FILED MAR. 22, 1905.
2 SHEETS—SHEET 1.
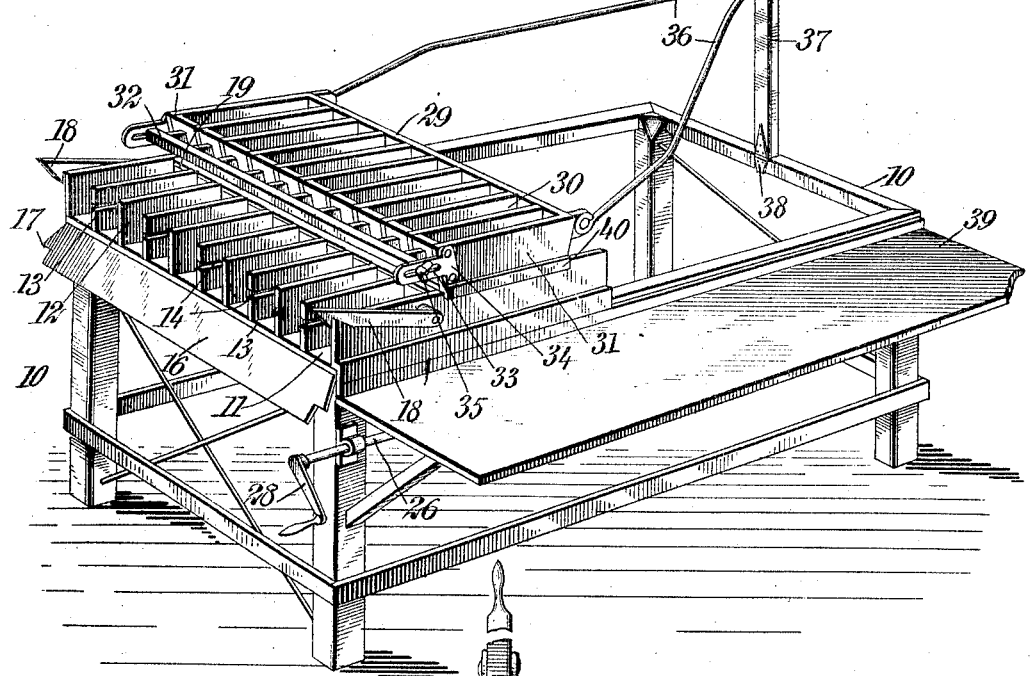
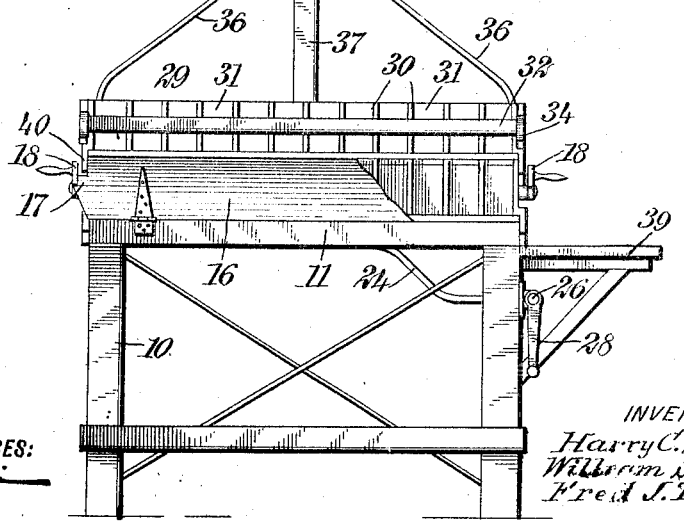
WITNESSES:
INVENTORS
Harry C. Steele
William Stenson
Fred J. Trout
BY
ATTORNEYS No. 810,988. PATENTED JAN. 30, 1906.
H. C. STEELE, W. STENSON & F. J. TROUT.
MOLDING MACHINE.
APPLICATION FILED MAR. 22, 1905.
2 SHEETS—SHEET 2.
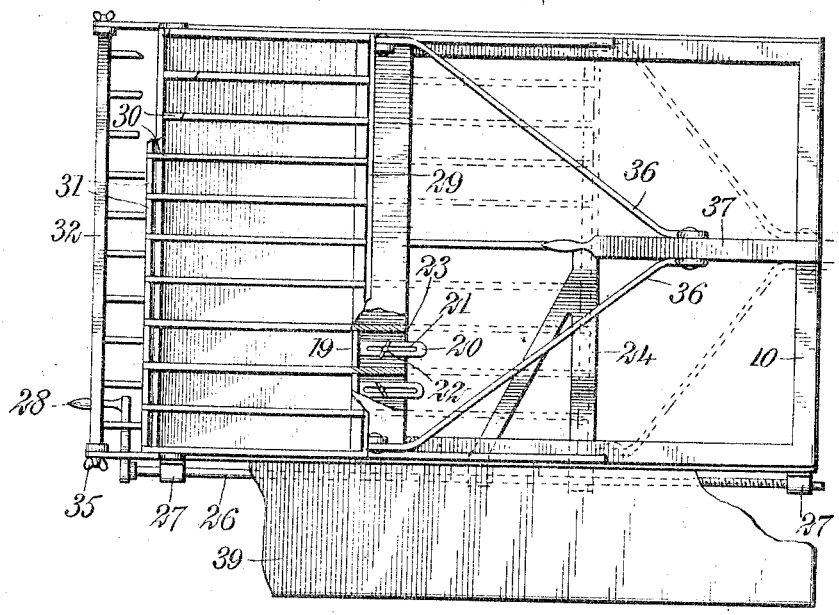
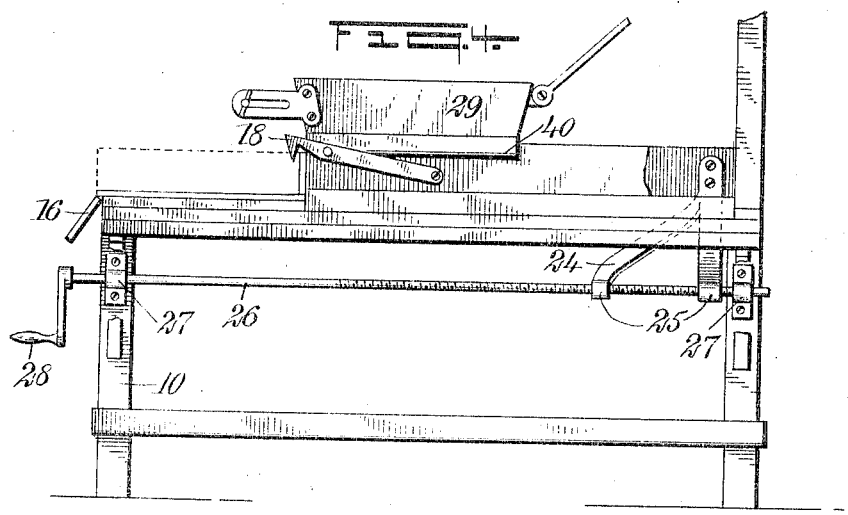
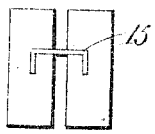
WITNESSES:
INVENTORS
Harry C. Steele
William Stenson
Fred J. Trout
BY
ATTORNEYS

UNITED STATES PATENT OFFICE.

HARRY C. STEELE, WILLIAM STENSON, AND FRED J. TROUT, OF JACKSONVILLE, FLORIDA.

MOLDING-MACHINE.

No. 810,988.     Specification of Letters Patent.     Patented Jan. 30, 1906.

Application filed March 22, 1905. Serial No. 251,398.

*To all whom it may concern:*

Be it known that we, HARRY C. STEELE, WILLIAM STENSON, and FRED J. TROUT, citizens of the United States, and residents of Jacksonville, in the county of Duval and State of Florida, have invented a new and Improved Molding-Machine, of which the following is a full, clear, and exact description.

Our invention relates to improvements in machines and molds for molding plastic materials.

While the principle of the invention is capable of general use for molding articles of various kinds, it is especially designed for brick and artificial-stone making and will be described with especial reference thereto.

The principal objects of the invention are to provide means for smoothing the sides of the molded articles as they are removed from the mold, to provide for quickly and efficiently removing them from the molds, to provide for attaching two articles together by means of an insert placed in them in the act of molding, to provide for a convenient and efficient introduction of the molding material into the molds, and to provide for adjustments to accommodate one set of molds to articles of different lengths.

Further objects of the invention will appear in the course of the subjoined description.

Reference is to be had to the accompanying drawings, forming a part of this specification, in which similar characters of reference indicate corresponding parts in all the figures.

Figure 1 is a perspective view of a molding-machine constructed in accordance with the principle of our invention for making bricks or artificial stones. Fig. 2 is a front end elevation thereof, partly broken away. Fig. 3 is a plan of the same, partly broken away and showing portions in section. Fig. 4 is a side elevation, and Fig. 5 is an end view, of a double building-block which can be molded on the machine.

The machine is provided with a main frame 10, which has a removable table, plate, or pallet 11, constituting a temporary bottom for the molds and used for transferring the product to the drying-racks. These molds are formed in part by reciprocable partition-plates 12 and 13. These partition-plates are preferably of two kinds, the plates 12 being solid from end to end and the plates 13 being provided with slots 14. The plates preferably are arranged alternately with each other, and the slots extend from the front of the plates 13 three-quarters of the way to their rear ends. These slots are provided for the purpose of supporting inserts 15, and the inserts are designed for securing two bricks or blocks together, so as to provide for a construction of double wall with an air-space between the two parts without the necessity of molding hollow blocks. When ordinary blocks or bricks are to be made, the slotted plates 13 are not used. The front ends of the molds are preferably formed by a hinged plate 16, connected with the frame 10 and designed to receive the ends of the plates 12 and 13 and to assume a vertical position in order to close the ends of all the molds when the molding operation is being performed. In order to hold the front plate in that position, it is provided with projections 17, and catches 18 are mounted upon the outside walls of the mold. The rear ends of the molds are formed by plates 19. These plates are provided with rearwardly-extending projections 20, having elongated slots 21, through each of which passes a thumb-screw 22 or other convenient fastening device. These thumb-screws are located upon a movable bar 23, and consequently they are capable of holding the plates 19 in stationary position, but provide for any desired adjustment in order to increase or decrease the length of the article to be formed in the mold.

Connected with the division-plates 12 and 13 is a frame 24. This frame is provided with screw-threaded bearings 25 for receiving a rotatable rod 26, having screw-threads. This rod is mounted in bearings 27 on the frame and is provided with a crank 28 for operating it. The rotation of this rod causes the reciprocation of the frame 24, and consequently of the division-plates 12 and 13.

In order to supply molding material to the molds and direct it to them in a uniform manner, a movable hopper 29 is provided. This has division-plates 30, corresponding with the division-plates 12 and 13, and is provided with adjustable ends 31. These ends are connected with a bar 32, which is adjustable longitudinally in a slot 33 in a plate 34, connected with the sides of the hopper. A screw 35 on each end of the bar 32 is used for securing the bar in adjusted position in the slots 33. This adjustment is provided in order to make the hopper conform to the molds as they are adjusted. Connected with the rear of the hopper is a frame 36, which is pivotally connected with a lever 37, hinged or pivoted at 38 to the rear part of the frame 10. A shelf 39 is preferably located upon the side of the machine for receiving the product thereof.

The operation of the machine is very simple. The plates 19 of the molds being adjusted to the desired position, the plate or pallet 11 is placed in front of and directly against the plates 19, the division-plates 12 and 13 are pushed forward to their extreme front position by the operation of the crank 28, and the front plate 16 fixed in vertical position. The plates 31 of the hoppers are then adjusted so as to make the hoppers of the same length of the molds and the lever 37 operated to bring the hoppers directly above the molds, the hoppers being guided on top of the side plates of the molds by means of ways 40. The molding material is then introduced into the molds through the hopper and tamped, as usual. When the tamping operation is completed, the hopper is drawn back by the operation of the lever 37 and the rear side of the hopper will scrape off the top of the molds and leave that face of the molded article in a smooth condition. The catches 18 are then raised to allow the front plate to drop, and then the crank 28 is operated to pull the division-plates back. The plates 19 then act as strippers for the plates 12 and 13, and the molded articles are left on the bottom plate 11, which is designed to be lifted out and carried away with the molded articles upon it to the curing-racks. In case the inserts are desired to be included they will of course be inserted in the slots 14 before the molding material is applied.

While we have illustrated one form in which our invention may be embodied, it will be readily understood that the invention is not limited to this form and can be carried out in many other forms and also that it is not limited to any particular molding material or to the molding of any particular objects.

Having thus described our invention, we claim as new and desire to secure by Letters Patent—

1. A molding-machine comprising a mold having a wall, and means for reciprocating the rest of the mold past said wall, said means comprising a frame connected with the main part of the mold and having a screw-threaded projection, and a rotatable rod having screw-threads for engaging said projection.

2. A molding-machine, comprising a mold having an adjustably-mounted wall, means for holding the wall in fixed position, and means for reciprocating the rest of the mold past said wall; said means comprising a frame connected with the main part of the mold and having a screw-threaded projection, and a rotatable rod having screw-threads for engaging said projection.

3. A molding-machine, comprising a series of adjustably-mounted mold-walls in alinement, means for holding each of said walls in adjusted positions, a series of division-plates, located between said walls and each alternate plate being provided with a slot for the reception of an insert, and means for moving said division-plates.

4. A molding-machine comprising a series of division-plates each alternate one having a slot for the reception of an insert, mold-walls surrounding said division-plates, and means for withdrawing said division-plates simultaneously from said mold-walls.

5. A molding-machine, comprising a series of adjustable mold-walls, a series of division-plates located between each two adjacent mold-walls, a front plate pivoted near the bottom of one edge of said division-plates, means for holding said front plate in vertical position against the ends of the division-plates, and means for moving the division-plates.

6. A molding-machine, comprising a bottom plate, a series of division-plates located thereabove and at an angle thereto and in parallel position with respect to each other, a series of back plates located between the rear ends of said division-plates, and a front plate extending across the front ends of the division-plates and pivotally mounted at its lower side, said front plate being provided with projections, and catches connected with the machine and adapted to engage said projections to hold the front plate against the ends of the division-plates.

7. A molding-machine comprising a mold having an adjustably-mounted wall in sections, each having a projection provided with a slot, means for holding the wall in fixed position comprising a series of screws passing through said slots, means for reciprocating the rest of the mold past said wall, a hopper movably mounted above said mold-wall, means for reciprocating the hopper, and means for adjusting the length of the hopper.

8. A molding-machine, comprising a movable mold having an adjustable wall, means for holding said wall in fixed position, a hopper mounted above said mold, said hopper having ways for guiding it in a straight line with respect to the mold, and means for moving the hopper comprising a lever pivotally connected with the machine and a frame connecting the lever and hopper.

9. A molding-machine, comprising a series of mold-walls in alinement, and a series of division-plates located between said walls, each alternate plate being provided with a slot for the reception of an insert.

10. A molding-machine, comprising a series of mold-walls in alinement, a series of division-plates located between said walls, each alternate plate being provided with a slot for the reception of an insert, and means for moving said division-plates longitudinally.

11. A molding-machine, comprising a series of division-plates, certain of said plates having slots for the reception of inserts, mold-walls located adjacent to said division-plates, and means for withdrawing the plates from the walls.

In testimony whereof we have signed our names to this specification in the presence of two subscribing witnesses.

HARRY C. STEELE.
WILLIAM STENSON.
FRED J. TROUT.

Witnesses:
A. KLAUS,
C. L. BARNES.